United States Patent
Murai et al.

(10) Patent No.: US 6,552,757 B1
(45) Date of Patent: Apr. 22, 2003

(54) LIQUID CRYSTAL DISPLAY ELEMENT AND METHOD FOR MANUFACTURING THE SAME

(75) Inventors: Atsuhito Murai, Soraku-gun (JP); Takeshi Hara, Matsuzaka (JP); Hidetake Ogata, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 96 days.

(21) Appl. No.: 09/688,380

(22) Filed: Oct. 17, 2000

(30) Foreign Application Priority Data

Oct. 19, 1999 (JP) .......................... 11-296555
Aug. 30, 2000 (JP) ....................... 2000-260646

(51) Int. Cl.⁷ ................................ G02F 1/136
(52) U.S. Cl. .................. 349/42; 257/59; 257/72; 257/347
(58) Field of Search ............... 349/42, 43, 92, 349/138, 187; 257/59, 72, 347

(56) References Cited

U.S. PATENT DOCUMENTS 6,016,174 A * 1/2000 Endo et al. .............. 257/59
6,195,138 B1 * 2/2001 Shimada et al. .......... 345/92

FOREIGN PATENT DOCUMENTS

JP 05-055567 3/1993
JP 06-067199 3/1994

* cited by examiner

*Primary Examiner*—James Dudek
*Assistant Examiner*—P. R. Akkapeddi
(74) *Attorney, Agent, or Firm*—Nixon & Vanderhye P.C.

(57) ABSTRACT

A liquid crystal display element comprising a liquid crystal layer, and a pair of transparent insulating substrates 1 being opposed to one another with said liquid crystal layer in between, on one of said transparent insulating substrates 1 being formed a gate signal wire 2a, a gate electrode 2b, an insulating film, a source signal wire 9a arranged orthogonal to said gate signal wire 2a, a source electrode 9b, a drain electrode 9c, a TFT formed near the crossing point of said gate signal wire 2a and said source signal wire 9a and comprising a semiconductor layer including a channel protection film 7a, and a pixel electrode 10 electrically connected to the TFT, wherein said channel protection film 7a has a side surface formed in the shape of an inverse taper.

10 Claims, 15 Drawing Sheets

| Film Thickness (nm) | Taper Angle θ (°) | Generation of Step Discontinuity |
|---|---|---|
| 200 | 70 | × |
|  | 60 | × |
|  | 45 | ◎ |
| 300 | 75 | △ |
|  | 60 | ○ |
|  | 45 | ◎ |
| 350 | 90 | △ |
|  | 75 | ◎ |
|  | 60 | ◎ |
|  | 45 | ◎ |
| 450 | 90 | ◎ |
|  | 75 | ◎ |
|  | 60 | ◎ |
|  | 45 | ◎ |

(a)

(b)

(d)

(e)

(f)

(a)

(b)

(a)

(b)

(a)

(b)

(d)

(e)

(f)

(a)

(b)

LIQUID CRYSTAL DISPLAY ELEMENT AND METHOD FOR MANUFACTURING THE SAME

FIELD OF THE INVENTION

The present invention relates to a liquid crystal display element and the method for manufacturing the same, and especially, to the structure of a liquid crystal display element providing improved display quality, reduced manufacturing cost and higher reliability when applied to a high definition large-sized display.

DESCRIPTION OF THE RELATED ART

Along with the development of information technology, needs for laptop computers, portable data terminals, car navigation systems and the like have rapidly increased, accompanied by the active research and development of liquid crystal display devices. Liquid crystal display elements used in a liquid crystal display device forms a display pattern on the screen by selectively driving each pixel electrode arranged in matrix in the display device. When voltage is applied to the selected pixel electrode and an opposing electrode, the display medium mounted between these electrodes, such as the liquid crystal, is optically modulated, and recognized as a display pattern. One method for driving the pixel electrodes is the active matrix driving method, wherein independent pixel electrodes are aligned in the display, and each independent pixel electrode is connected to a switching element and driven by the same. Generally known as examples for the switching element used for selectively driving the pixel electrodes are the thin film transistor (hereinafter called TFT) and the MIM (metal-first insulation film-metal).

Resent trend of liquid crystal display panels is the large-sized high-definition panel, and active research is performed in this field. However, along with the increase in size of the panel or the glass substrate, it became increasingly difficult to provide a panel having homogeneous (even) display.

One cause of this problem is the superposition mismatch of the patterns, which results from performing plural numbers of photolithography when manufacturing the liquid crystal display element. When patterns are superposed during the repeated photolithography steps, there is generated within the substrate surface a region where the superposed areas L·W of the gate electrode and the drain electrode differ ($(L+\Delta x_1) \cdot W$, $(L+\Delta x_2) \cdot W$, . . . ). When this occurs, the parasitic capacity proportional to that area ($(L+\Delta x_1) \cdot W$, $(L+\Delta x_2) \cdot W$, . . . ), that is, the parasitic capacity (Cgd) between the gate electrode and the drain electrode, is also dispersed within the substrate plane.

The degree of dispersion becomes conspicuous as the size of the glass substrate and the panel increases. This is mainly because (1) the accuracy of the exposure equipment used during the photolithography method is deteriorated as the size of the glass substrate and the panel increases; and (2) the influence of deflection of the glass panel starts to appear as the size of the glass substrate increases.

On the other hand, in the example of an active matrix liquid crystal display including TFT elements as its component, after a certain TFT element is selected and charged to a predetermined signal potential, and simultaneously when the gate is closed, the pixel potential is fluctuated for ΔV. This is caused by the capacity coupling of the parasitic capacity (Cgd) between the gate electrode-drain electrode of the TFT element, the liquid crystal capacity (Clc) and the subsidiary capacity (Ccs). The size of ΔV is computed by the following formula (1).

$$\Delta V = \Delta Vg \cdot Cgd/(Cgd+Clc+Ccs) \quad (1)$$

ΔVg: variation quantity of gate voltage

Cgd: parasitic capacity between gate electrode-drain electrode

Ccs: subsidiary capacity

When the value of Cgd in formula (1) is dispersed within the same panel plane, it means that ΔV is dispersed, which leads to dispersion of the pixel potentials. As a result, problems such as display unevenness or flickering of the panel are caused.

Prior art examples 1 and 2 are used to explain the above-mentioned problems. First, the liquid crystal display element according to prior art example 1 comprises, as shown in FIG. 7(*a*) showing the explanatory plan view of a unit pixel and FIG. 7(*b*) showing the explanatory cross-sectional view taken at line A–A' of FIG. 7(*a*), a liquid crystal layer (not shown), and a pair of transparent insulating substrates 21 facing each other with the liquid crystal layer positioned in between. Mounted on one of said pair of transparent insulating substrates 21 are a gate signal wire 22*a*; a source signal wire 29*a* formed orthogonal to the gate signal wire 22*a*; a laminated semiconductor layer formed near the crossing point of the gate signal wire 22*a* and the source signal wire 29*a* and including a gate electrode 22*b*, a gate insulation film 25, a semiconductor layer (a-Si layer) 26*a*, a semiconductor junction layer (n+-Si layer) 28, a channel protection film 27, a source electrode 29*b*, and a drain electrode 29*c*; and a pixel electrode 30 electrically connected to the laminated semiconductor layer. The channel protection film 27 has a side surface 273 positioned substantially perpendicular to the film surface, for example.

The method for manufacturing the prior art example 1 will now be explained with reference to FIGS. 8 and 9. Sputtering method is used to form a film made of Al, Mo, Ta or the like on a transparent insulating substrate 21. Then, through photolithography, a gate wire (not shown), a gate electrode 22*b* and a subsidiary capacity wire 23 are formed (refer to FIG. 8*a*).

Next, an anodic oxidation film 24 is formed through anodic oxidation. Subsequently, three layers each formed of a gate insulation film (SiNx) 25, an a-Si material 26, and a channel protection film 27 are continuously formed through CVD method. Then, a positive-type resist film is applied, the whole surface of which being exposed from the back surface of the transparent insulating substrate 21 using the gate electrode 22*b* as mask. The positive-type resist film pattern formed by developing the exposed film is used as a mask for etching the channel protection film 27 having an island-shaped pattern (refer to FIG. 8*b*).

Next, an n+-Si layer 28 is formed, to which is provided photolithography in order to form a contact layer that contacts the source electrode 29*b* and the drain electrode 29*c*. At this time, the lower layer formed of a-Si material 26 is patterned into an island-shape simultaneously when the n+-Si layer 28 is etched, and becomes the a-Si layer 26*a* (refer to FIG. 8*c*).

Next, a metal layer (source/drain metal) is formed using Mo, Ta and the like, which is then patterned into the desired shape through photolithography, forming a source signal wire 29*a*, a source electrode 29*b* and a drain electrode 29*c* (refer to FIG. 9*d*).

The TFT portion constituting the switching element of each individual pixel is formed according to the method explained above. Next, a transparent conductive film is formed using ITO and the like, which is then patterned to the desired shape through photolithography, forming a pixel electrode 30 (refer to FIG. 9e).

Next, a passivation film 31 formed of SiNx and the like is formed through CVD method, which is then patterned into the desired shape (refer to FIG. 9f).

According to the manufacturing method of prior art example 1, if the pattern of the source/drain electrode is displaced on the substrate surface, the overlapping area of the gate electrode 22b and the drain electrode 29c on the substrate or panel plane is changed. In other words, when in one area of the substrate, the overlapping area of the gate electrode 22b and the drain electrode 29c is L·W1 as shown in FIG. 10(a) and (b), while in another area, the overlapping area is (L+Δx)·W2 as shown in FIG. 11(a) and (b) (W1≈W2≈W), than the parasitic capacity (Cgd) will increase in proportion to this increase in the overlapping area (Δx·W). As a result, the pixel potentials in the substrate or panel plane are dispersed, and the display becomes uneven.

In order to solve this problem, a liquid crystal display element and the method for manufacturing the same is proposed, that is capable of forming the source/drain electrodes in a self-matching manner and thereby reducing the inner-plane dispersion of the parasitic capacity (Cgd) between the gate electrode and the drain electrode caused by pattern mismatch.

The proposed prior art example 2 will now be explained with reference to FIGS. 12 through 15. The explanatory plan view of a unit pixel of the liquid crystal display element according to prior art example 2 is shown in FIG. 12. The A–A' cross-sectional view of FIG. 12 showing each stage of the manufacturing steps are shown in FIGS. 13 and 14. The liquid crystal display element according to prior art example 2, similar to prior art example 1, comprises a liquid crystal layer (not shown), and a pair of transparent insulating substrates 41 facing each other with the liquid crystal layer positioned in between. On one of said pair of transparent insulating substrates 21 is formed a gate signal wire 42a, a source signal wire 49a formed orthogonal to the gate signal wire 42a, a laminated semiconductor layer mounted near the crossing point of the gate signal wire 42a and the source signal wire 49a and including a gate electrode 42b, a gate insulation film 45, a semiconductor layer (a-Si layer) 46a, a semiconductor junction layer (n+-Si layer) 48, a channel protection film 47, a source electrode 49b, a drain electrode 49c and so on, and a pixel electrode 50 electrically connected to the laminated semiconductor layer. The channel protection film 47 has aside surface 473 positioned substantially perpendicular to the film surface, for example.

The method for manufacturing the prior art example 2 will now be explained with reference to FIGS. 13 and 14. Sputtering method is used to form a film made of Al, Mo, Ta or the like on a transparent insulating substrate 41. Then, through photolithography, a gate wire (not shown), a gate electrode 42b and a subsidiary capacity wire 43 are formed (refer to FIG. 13a).

Next, an anodic oxidation film 44 is formed through anodic oxidation. Subsequently, three layers each formed of a gate insulation film (SiNx) 45, an a-Si material 46, and a channel protection film 47 are continuously formed through CVD method. Then, a positive-type resist film is applied, the whole surface of which being exposed from the back surface of the transparent insulating substrate using the gate electrode 22a as mask. The positive-type resist film pattern 52 formed by developing the exposed film is used as a mask for etching the channel protection film 47 having an island-shaped pattern (refer to FIG. 13b).

Next, while leaving on the positive resist 52 used for patterning the channel protection film 47, an n+-Si layer 48 and a metal film made of Mo, Ta and the like (source/drain metal) are sequentially formed on the substrate (refer to FIG. 13c), which is patterned to a desired shape through photolithography, thereby forming the source signal wire 49a, the source electrode 49b and the drain electrode 49c (refer to FIG. 14d). At this time, the a-Si material 46, the n+-Si layer 48, the source signal wire 49a, the source electrode 49b and the drain electrode 49c are patterned to the same shape. Further, by lifting off the positive resist used for patterning the channel protection film 47, there is formed a liquid crystal display element having a parasitic capacity (Cgd) between the drain electrode 49b and the gate electrode 42a that is not influenced by the mismatch of the patterns of the source electrode 49b and the drain electrode 49b (refer to FIGS. 15a and b).

The TFT constituting the switching element of each individual pixel is formed according to the method explained above. Next, a transparent conductive film is formed using ITO and the like, which is then patterned to the desired shape through photolithography, forming a pixel electrode 50 (refer to FIG. 14e).

Next, a passivation film 51 formed of SiNx and the like is formed through CVD method, which is then patterned to the desired shape (refer to FIG. 14f).

According to the method of prior art example 2, the inner-plane unevenness or the flickering of the display caused by mismatch of the superposed patterns is reduced, and the number of photolithography steps could be cut down. However, when the positive resist used for patterning the channel protection film 47 is not removed from the laminated structure before forming the n+-Si layer through CVD method on the structure, it caused serious problems to the TFT element such as (1) compound considered to be the reaction product of the film forming gas and the resist (which is an organic compound) being mixed into the chamber or the film as dust, and (2) bubbles appearing in the n+-Si film.

According to another prior art example, there is a proposal to form source electrodes on both sides of the drain electrode in order to prevent the fluctuation of parasitic capacity caused by mismatch of patterns (refer to Japanese Patent Laid-Open Publication No. 6-67199). According to yet another example, a proposal has been made to remove the resist film and to lift off the semiconductor junction layer or the source/drain metal film (refer to Japanese Patent Laid-Open Publication No. 5-55567). However, the prior art disclosures lack to consider patterning the source/drain electrodes in a self-matching manner by providing a channel protection film having an inverse tapered side surface.

SUMMARY OF THE INVENTION

The present invention aims at solving the problems of the prior art. The object of the present invention is to provide a liquid crystal display element having improved display quality, reduced manufacturing cost and higher reliability even when applied to a large high definition display, and the method for manufacturing the same.

The present invention provides a liquid crystal display element comprising: a pair of transparent insulating substrates facing each other with a liquid crystal layer in between; a thin-film transistor including a gate electrode formed on one of the pair of transparent insulating substrates, a gate insulation film formed on the gate electrode, a semiconductor layer formed on the gate insulation film, a channel protection film arranged on the semiconductor, a semiconductor junction layer formed on the channel protection film, a source electrode, and a drain electrode; and a pixel electrode; the thin-film transistor being arranged near each crossing point of a plurality of gate signal wires and source signal wires, the gate electrode being connected to the gate signal wire and one end of the source electrode being connected to the source signal wire in the vicinity of the crossing point, and one end of the drain electrode being connected to the pixel electrode; wherein the semiconductor junction layer, the other end of the drain electrode and the other end of the source electrode both being formed on the semiconductor junction layer are separated on the semiconductor layer by the channel protection film, the side surface of the channel protection film being formed as an inverse taper.

Moreover, the present invention provides a liquid crystal display element, wherein the semiconductor layer is an intrinsic semiconductor layer.

Even further, the present invention provides a liquid crystal display element, wherein the thickness of the channel protection film is 350 nm or more.

Moreover, the present invention provides a liquid crystal display element, wherein the ratio of the junction surface area of the channel protection film adjoining the passivation film being formed above the protection film and the junction surface area of the film adjoining the intrinsic semiconductor layer being formed below said film (area of the junction surface adjoining said passivation film/area of the junction surface adjoining said semiconductor layer) is 1.05 or more.

According to the present invention, the method for manufacturing a liquid crystal display element comprises the steps of: forming a gate signal wire and a gate electrode on a transparent insulating substrate; sequentially laminating on the upper surface of the gate signal wire and the gate electrode a gate insulation film, a semiconductor layer, and a channel protection film; applying a positive-type resist on the upper surface of the laminated transparent insulating substrate, the whole surface of the positive-type resist being exposed from the back surface of the transparent insulating substrate using the gate electrode as mask, and then etching the channel protection film using the developed and formed positive-type resist film pattern as mask so that the side surface of the channel protection film is formed as an inverse taper; etching the semiconductor layer using the channel protection film having an inverse tapered side surface as mask; and sequentially laminating on the transparent insulating substrate a semiconductor junction layer and a material for forming source signal wire, source electrode, and drain electrode, then forming the source signal wire, the source electrode and the drain electrode using as mask a resist film formed by applying, exposing and developing a resist material.

According to the above-explained invention, the source electrode and the drain electrode could be formed in a self-matching manner, realizing a structure where the parasitic capacity (Cgd) between the drain electrode and the gate electrode is not influenced by the mismatch of the pattern of the source/drain electrodes. In other words, according to the invention, problems such as inner-plane unevenness or the flickering of the display are reduced. According further to the present invention, the patterning of both the channel protection film and the semiconductor layer is performed by a single photolithography step, which enables to cut down the number of photolithography steps compared to the prior art method.

BRIEF DESCRIPTION OF THE DRAWINGS

FIG. 5 is a chart explaining the relation between the film thickness of the channel protection film, the taper angle and the generation of step discontinuity according to embodiment 1;

DETAILED DESCRIPTION OF PREFERRED EMBODIMENTS

The preferred embodiment of the present invention will now be explained.

Figure 1:
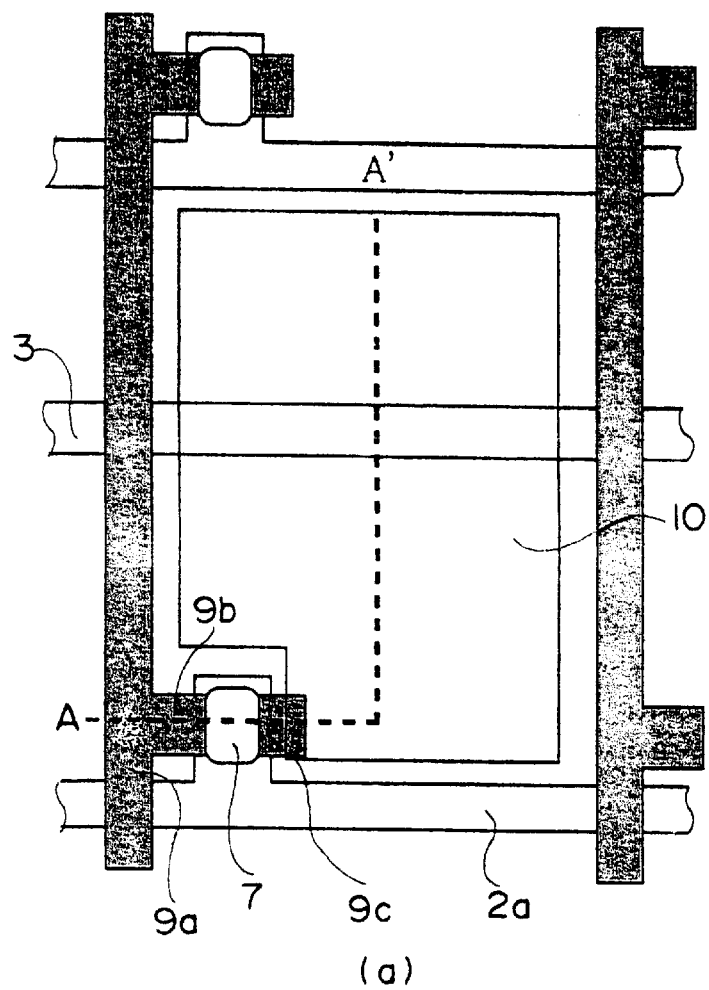
FIG. 1 is a plan view and an explanatory cross-sectional view of a unit pixel of the liquid crystal display element according to embodiment 1.
Figure 1:
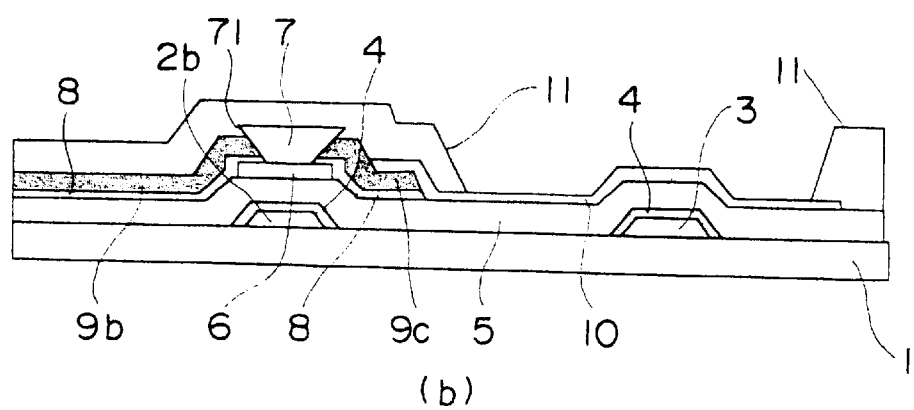
Figure 2:
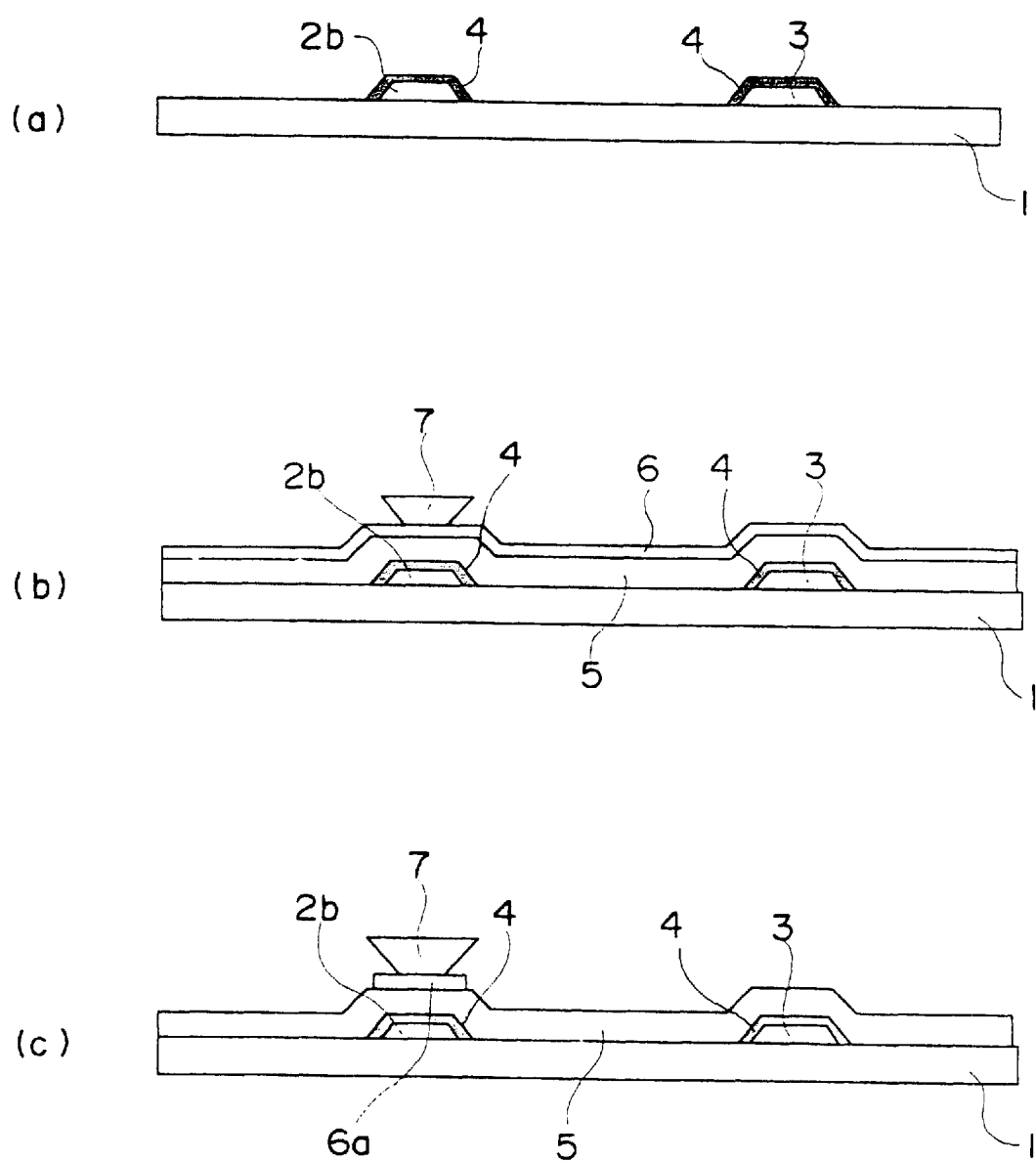
FIG. 2 is an explanatory view showing the former half of the manufacturing steps of the liquid crystal display element according to embodiment 1.
Figure 3:
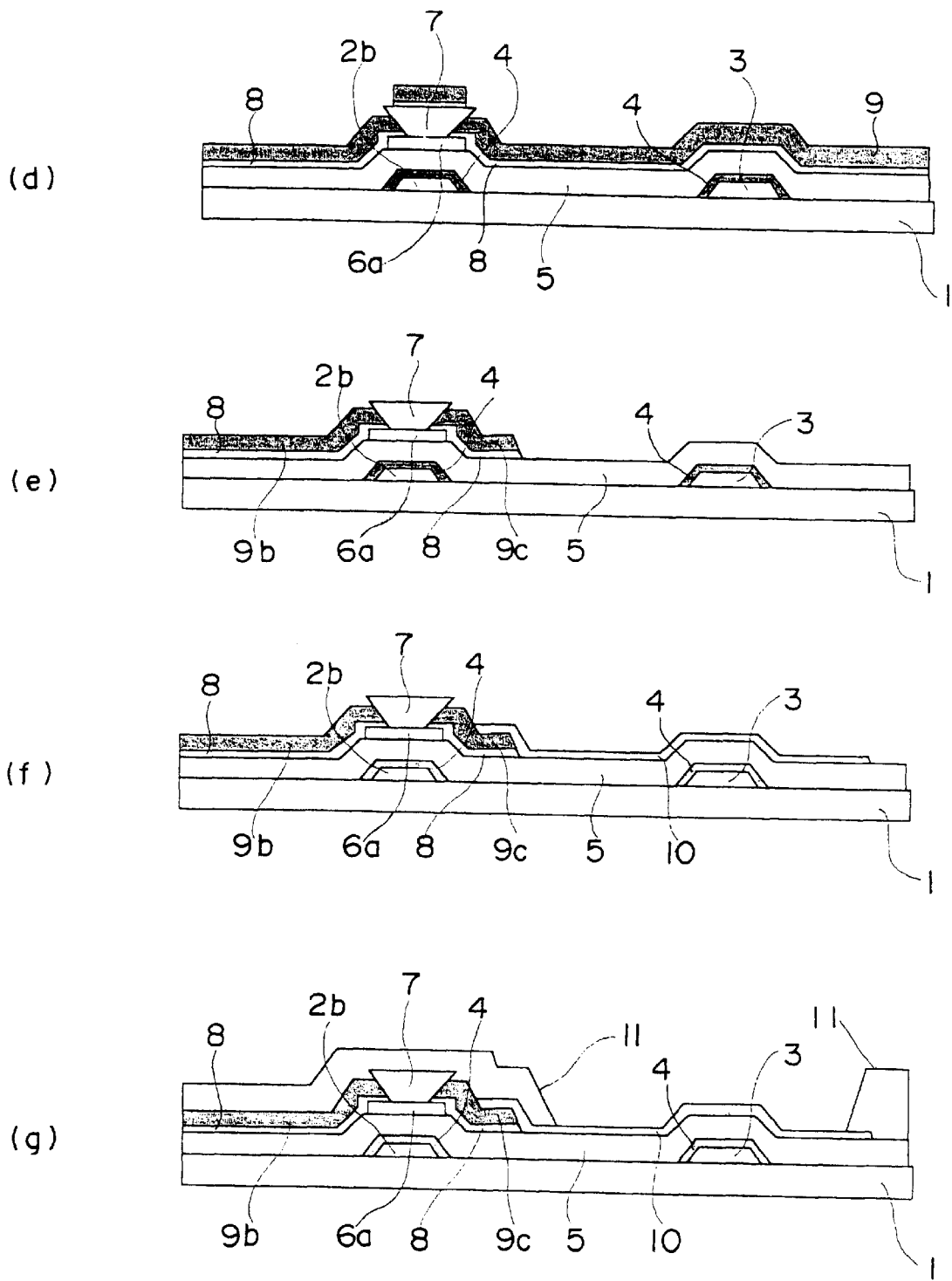
FIG. 3 is an explanatory view showing the latter half of the manufacturing steps of the liquid crystal display element according to embodiment 1.
Figure 4:
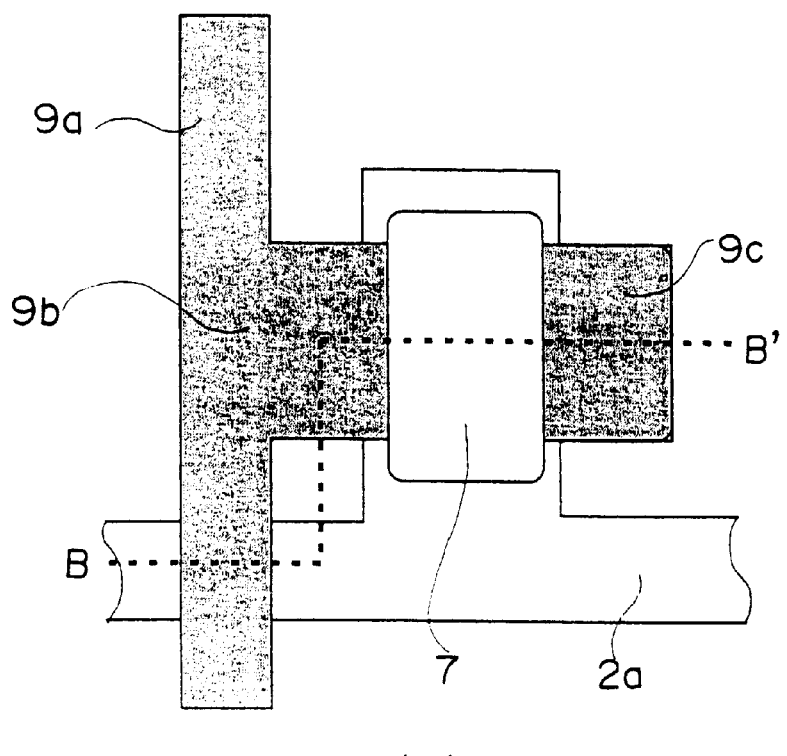
FIG. 4 is a plan view and an explanatory cross-sectional view showing the TFT portion of the liquid crystal display element according to embodiment 1.
Figure 4:
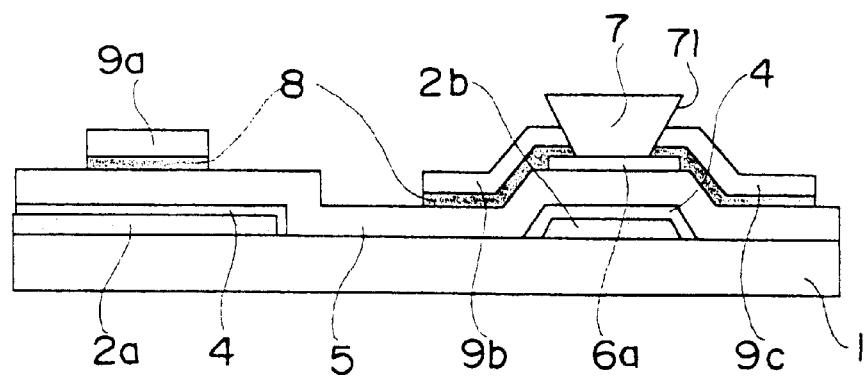

An embodiment of the liquid crystal display element and the method for manufacturing the same according to the present invention will now be explained with reference to FIGS. 1 through 5. FIG. 1(a) is an explanatory plan view showing a unit pixel of the liquid crystal display element according to embodiment 1. FIG. 1(b) is an explanatory cross-sectional view taken at line A–A' of FIG. 1(a). FIG. 2 is an explanatory view showing the former half of the manufacturing steps for manufacturing the liquid crystal display element of embodiment 1. FIG. 3 is an explanatory view showing the latter half of the manufacturing steps of embodiment 1. FIG. 4(a) is an explanatory plan view showing the TFT portion of the liquid crystal display element of embodiment 1. FIG. 4(b) is an explanatory cross-sectional view taken at line B–B' of FIG. 4(a). FIG. 5 is a chart showing the relation between the film thickness of the channel protection film, the taper angle and the generation of step discontinuity according to embodiment 1.

Embodiment 1 will now be explained. As shown in FIGS. 1(a) and 1(b), the liquid crystal display element according to the present embodiment comprises a liquid crystal layer (not shown), and a pair of transparent insulating substrates 1 opposed to one another with the liquid crystal layer in between. On one of the insulating substrates 1 is formed a gate signal wire 2a; a source signal wire 9a positioned orthogonal to the gate signal wire 2a; a thin-film transistor formed near the crossing point of the gate signal wire 2a and the source signal wire 9a, the thin-film transistor comprising a gate electrode 2b, a gate insulation film 5, a semiconductor layer (a-Si layer) 6, a semiconductor junction layer (n+-Si layer) 8, a channel protection film 7, a source electrode 9b, and a drain electrode 9c; and a pixel electrode 10 electrically connected to the drain electrode 9c of the thin-film transistor. The channel protection film 7 has an end surface 71 formed in a slope, the slope being an "inverse taper" shape, in which the upper portion is protruded (larger) than the lower portion. Thereby, the overlapped area of the gate electrode 2b and the drain electrode 9c could be controlled to a predetermined value, reducing the inner-plane unevenness of the display or the flickering caused by the overlap mismatch of the pattern during manufacture.

The method for manufacturing the liquid crystal display element according to embodiment 1 will now be explained with reference to FIGS. 2 through 4. Material such as Ta is used to form a film having a thickness of approximately 200 nm on the insulating substrate 1 through sputtering method. Then, through photolithography, the gate wire 2a, the gate electrode 2b and the subsidiary capacity signal wire 3 are formed, and an anodic oxidation film 4 is formed through anodic oxidation method (refer to FIG. 2a).

Next, a plasma CVD method is used to continuously form the gate insulation film (silicon nitride: SiNx) 5 to a thickness of approximately 300 nm, an a-Si material 6 constituting the a-Si layer 6a to a thickness of approximately 150 nm, and the channel protection film material constituting the channel protection film 7 to a thickness of over 350 nm (for example, around 500 nm). At this time, the channel protection film is formed under a certain condition (one example of the conditions is; $SiH_4$: 150 sccm, $NH_3$: 750 sccm, $N_2$: 2000 sccm, 2000 mT, 700 W) so that the cohesion force between the upper surface of the channel protection film 7 (the junction surface adjoining a positive-type resist) and the positive-type resist film applied in the following step is stronger than the cohesion force between the a-Si layer 6a and the lower surface of the channel protection film 7 (the junction surface adjoining the a-Si layer 7). Then, a positive-type resist film (not shown) is applied on the layer 7, and the whole surface of the positive-type resist film is exposed from the back surface of the transparent insulating substrate 1 using the gate electrode 2b as mask. After developing and forming the positive-type resist film pattern, the pattern is used as a mask for wet-etching (over-etching) the channel protection film material using a fluorine-system etching fluid, thereby shaping the end side surface of the channel protection film 7 as inverse taper (refer to FIG. 2b). The conditions for the wet-etching is as follows: solution; buffer fluoric acid (BHF), temperature; 24° C., time; 560 sec (when film thickness is 500 nm).

Thereafter, the island-shaped a-Si layer 6a is formed by dry-etching the a-Si material 6 using the channel protection film 7 as mask and utilizing $SF_6$—HCl system gas (refer to FIG. 2c). The plan view and the explanatory cross-sectional view showing the TFT portion of the liquid crystal display element at this point is shown in FIGS. 4(a) and 4(b). The side surface 71 of the channel protection film is formed as an "inverse taper" where the upper portion is protruded (wider) than the lower portion.

Figure 6:
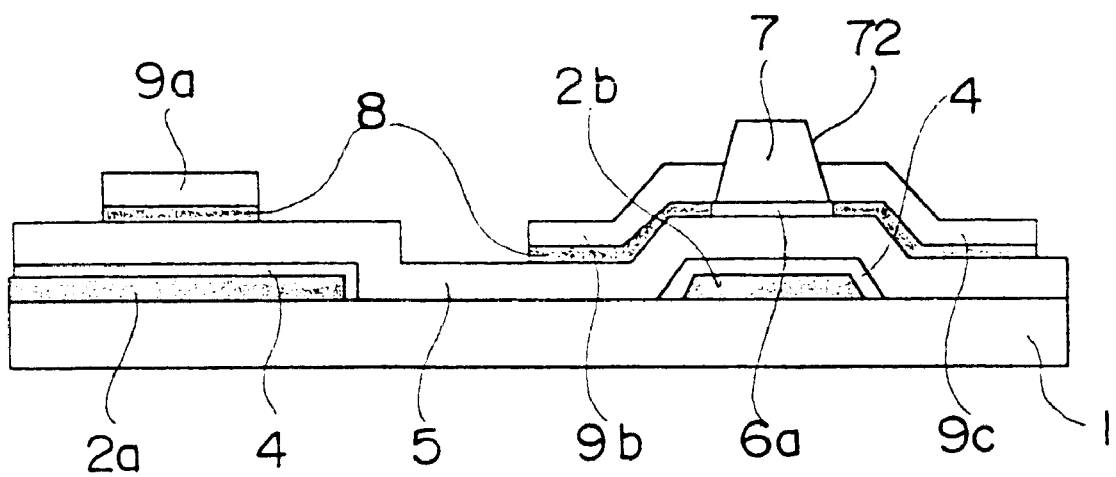
FIG. 6 is an explanatory cross-sectional view showing the TFT portion of the liquid crystal display element according to a comparison example.
Figure 7:
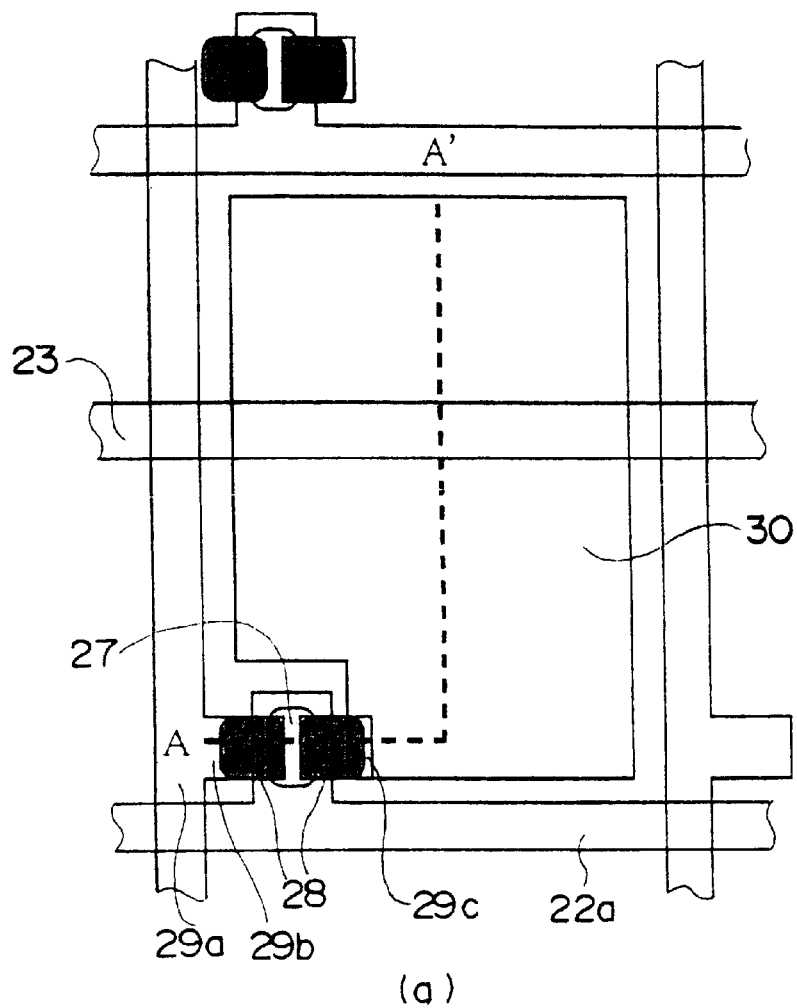
FIG. 7 is a plan view and an explanatory cross-sectional view showing a unit pixel of the liquid crystal display element according to prior art example 1.
Figure 7:
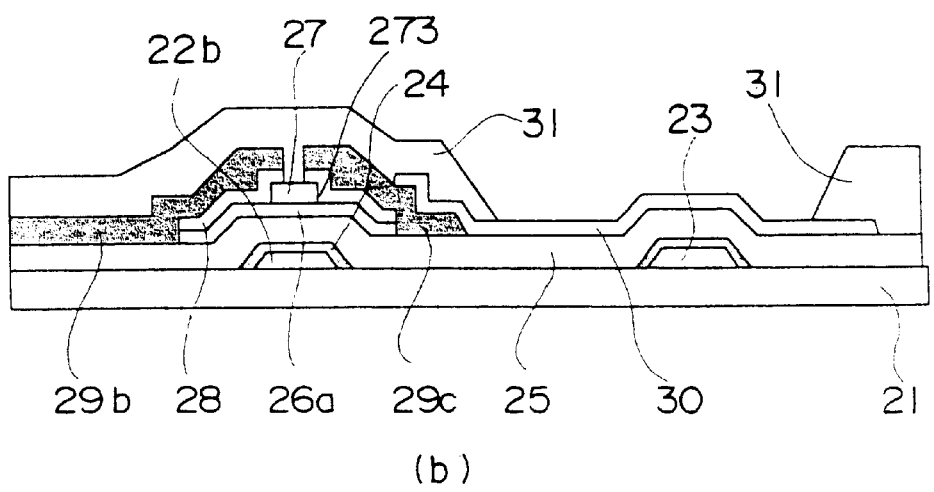
Figure 8:
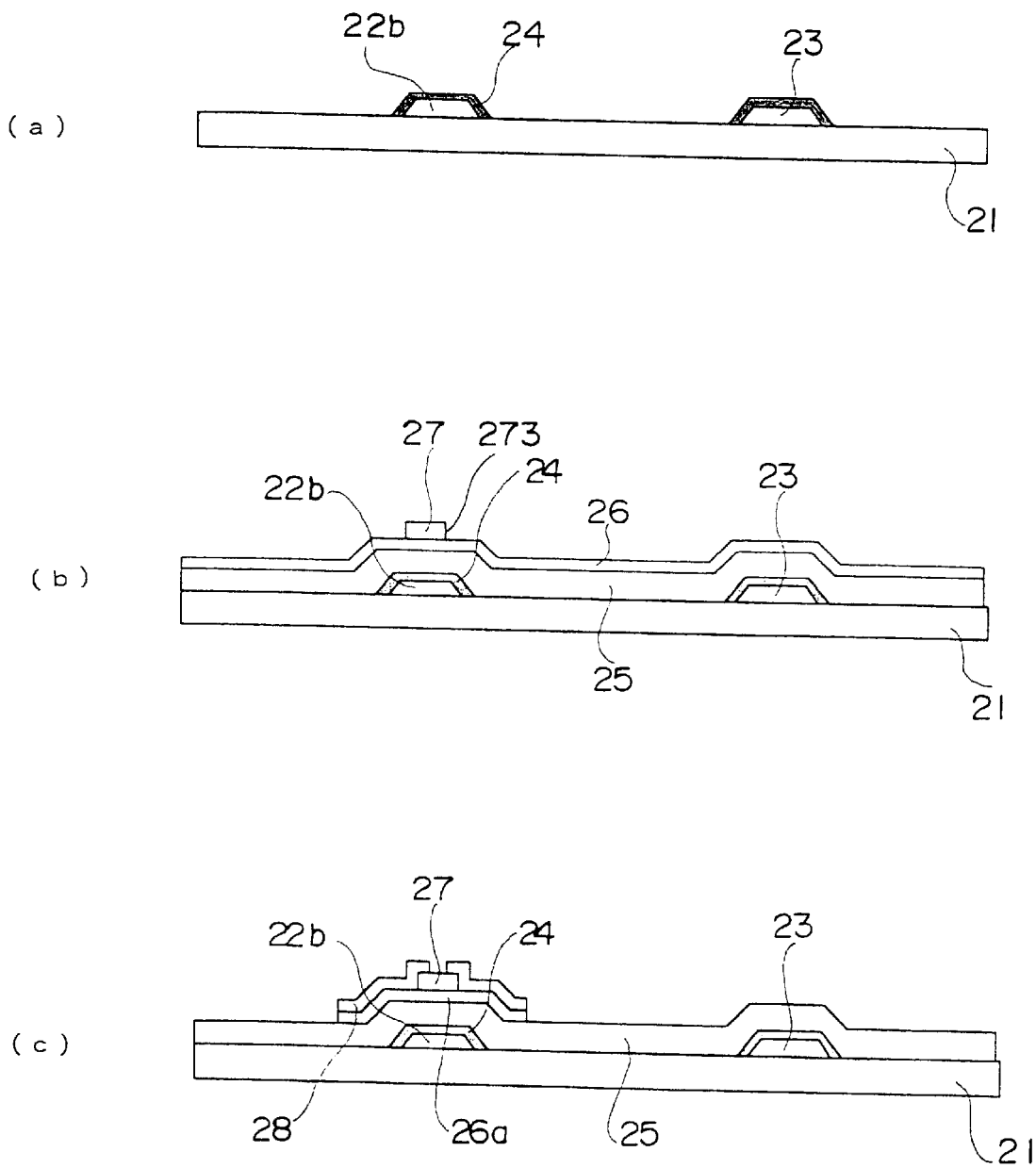
FIG. 8 is an explanatory view showing the former half of the manufacturing steps of the liquid crystal display device according to prior art example 1.
Figure 9:
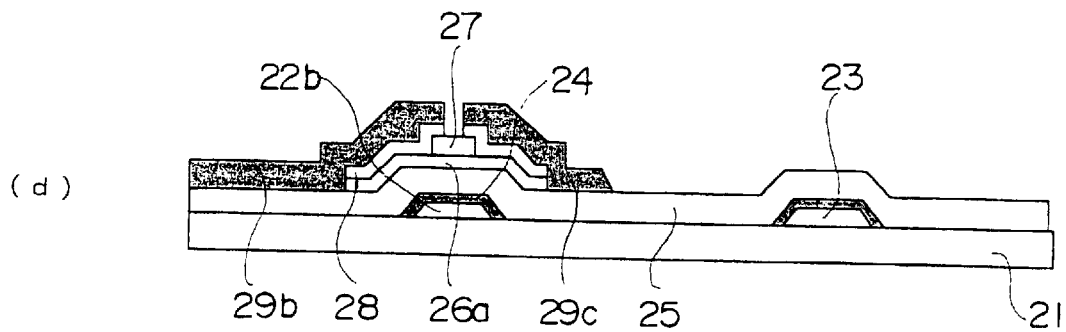
FIG. 9 is an explanatory view showing the latter half of the manufacturing steps of the liquid crystal display device according to prior art example 1.
Figure 9:
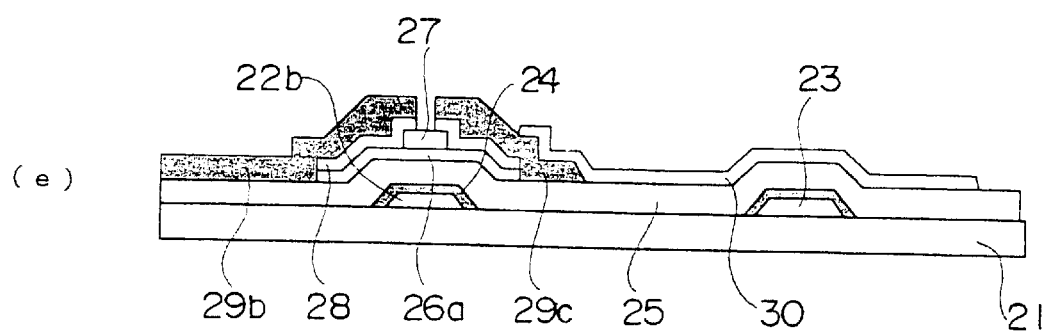
Figure 9:
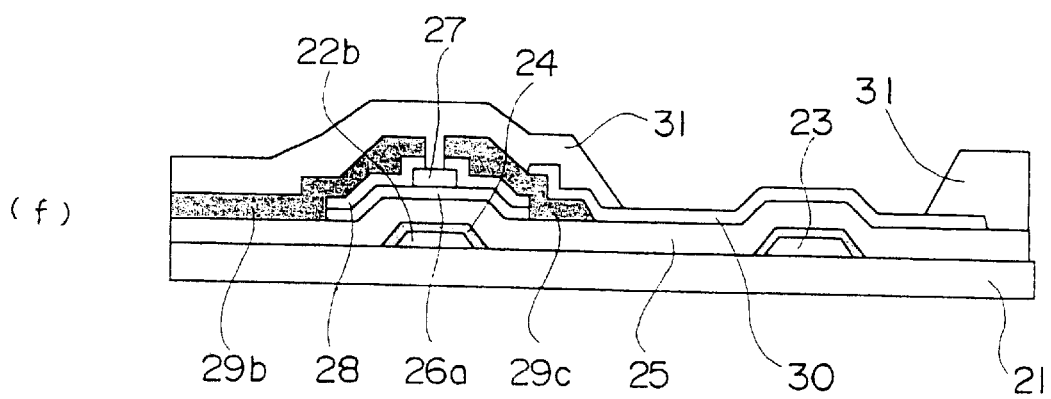
Figure 10:
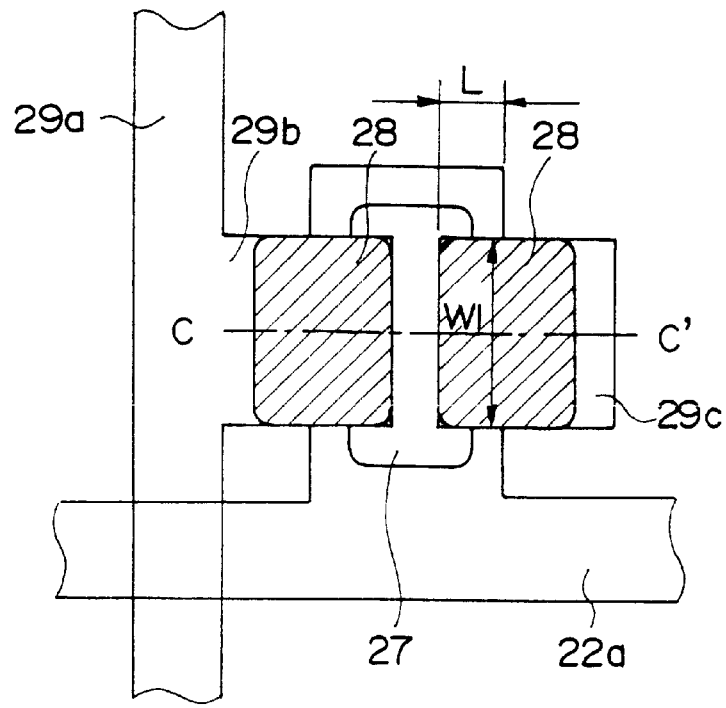
FIG. 10 is a plan view and an explanatory cross-sectional view showing the TFT portion of the liquid crystal display element according to prior art example 1.
Figure 10:
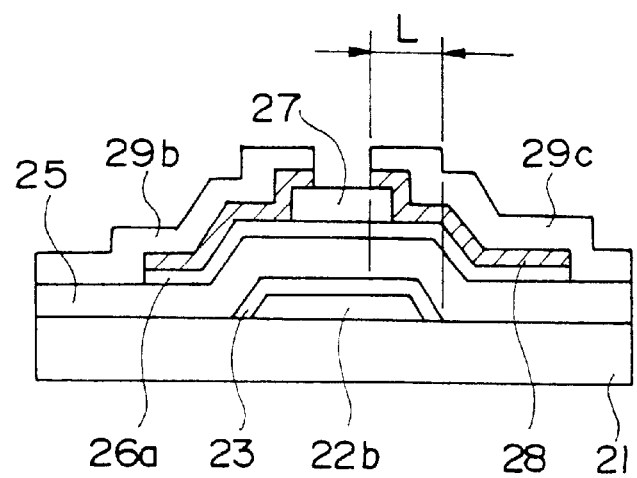
Figure 11:
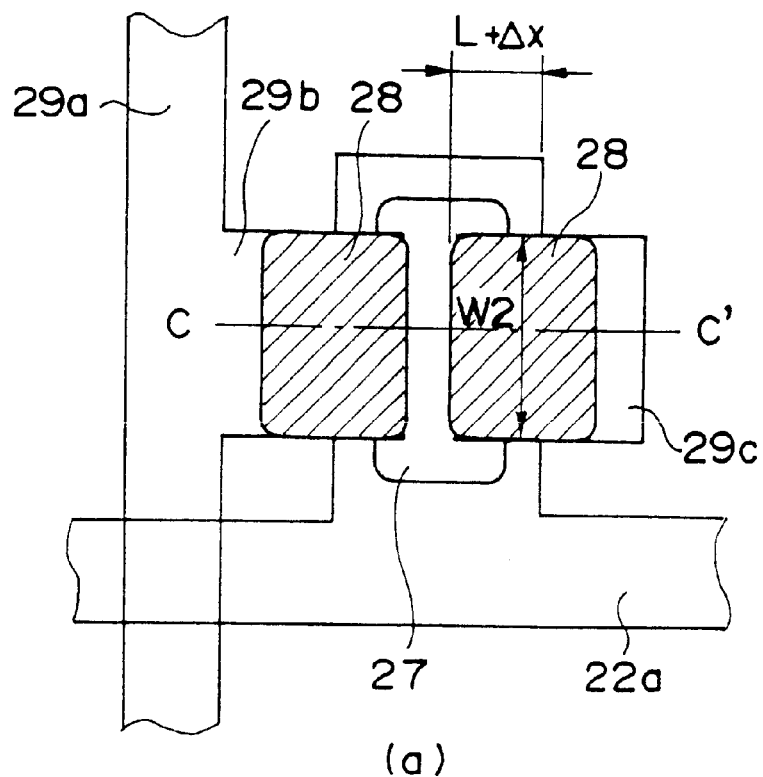
FIG. 11 is a plan view and an explanatory cross-sectional view showing the TFT portion of another position in the liquid crystal display element according to prior art example 1.
Figure 11:
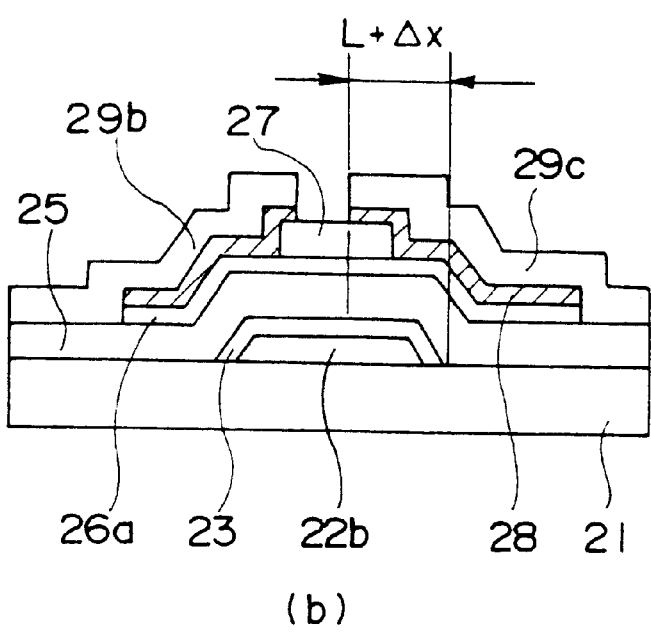
Figure 12:
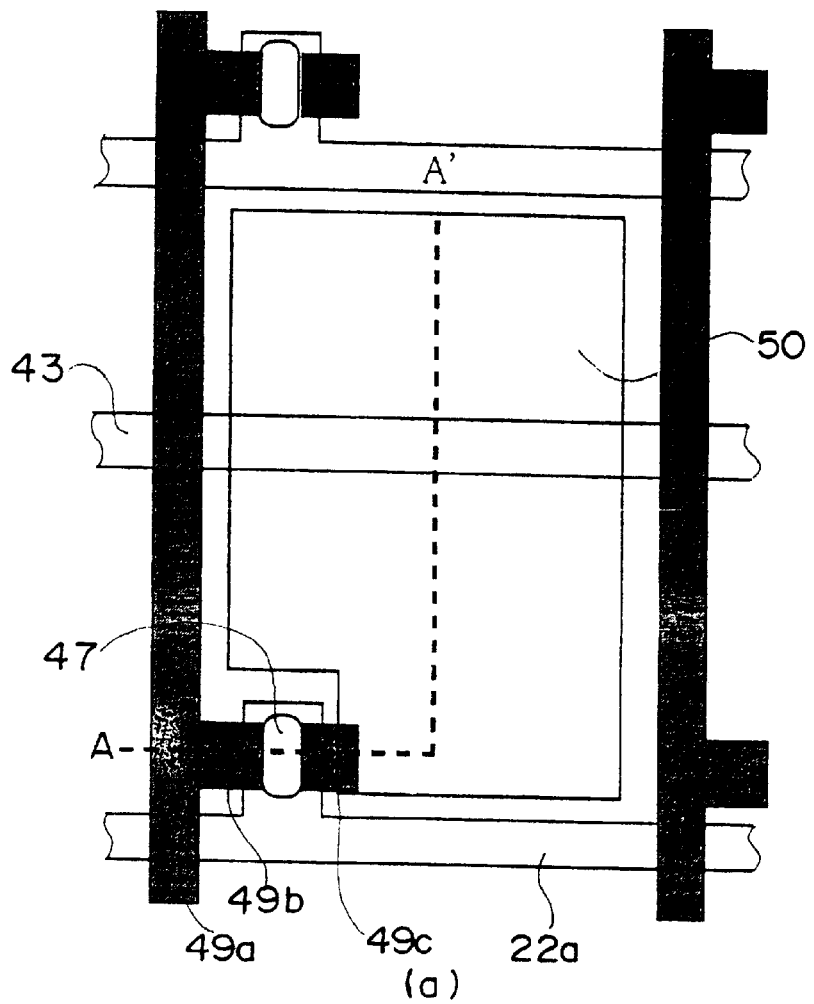
FIG. 12 is a plan view and an explanatory cross-sectional view showing the TFT portion of the liquid crystal display device according to prior art example 2.
Figure 12:
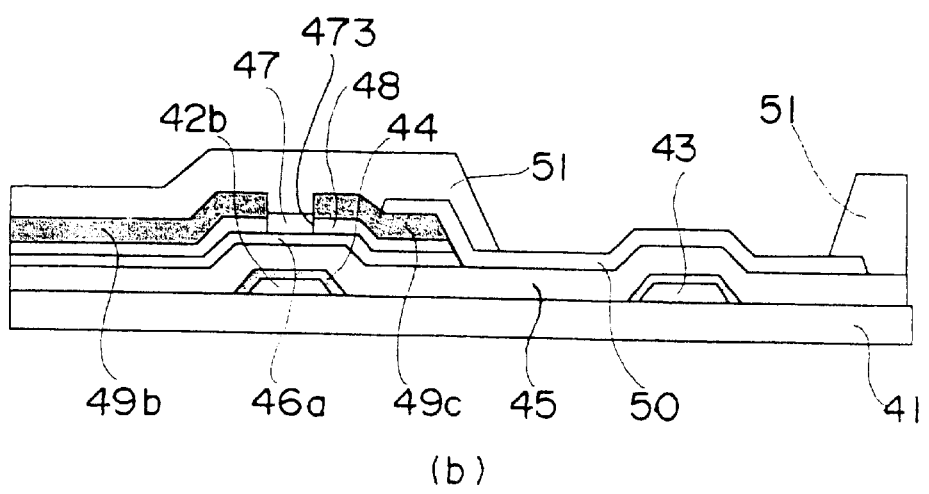
Figure 13:
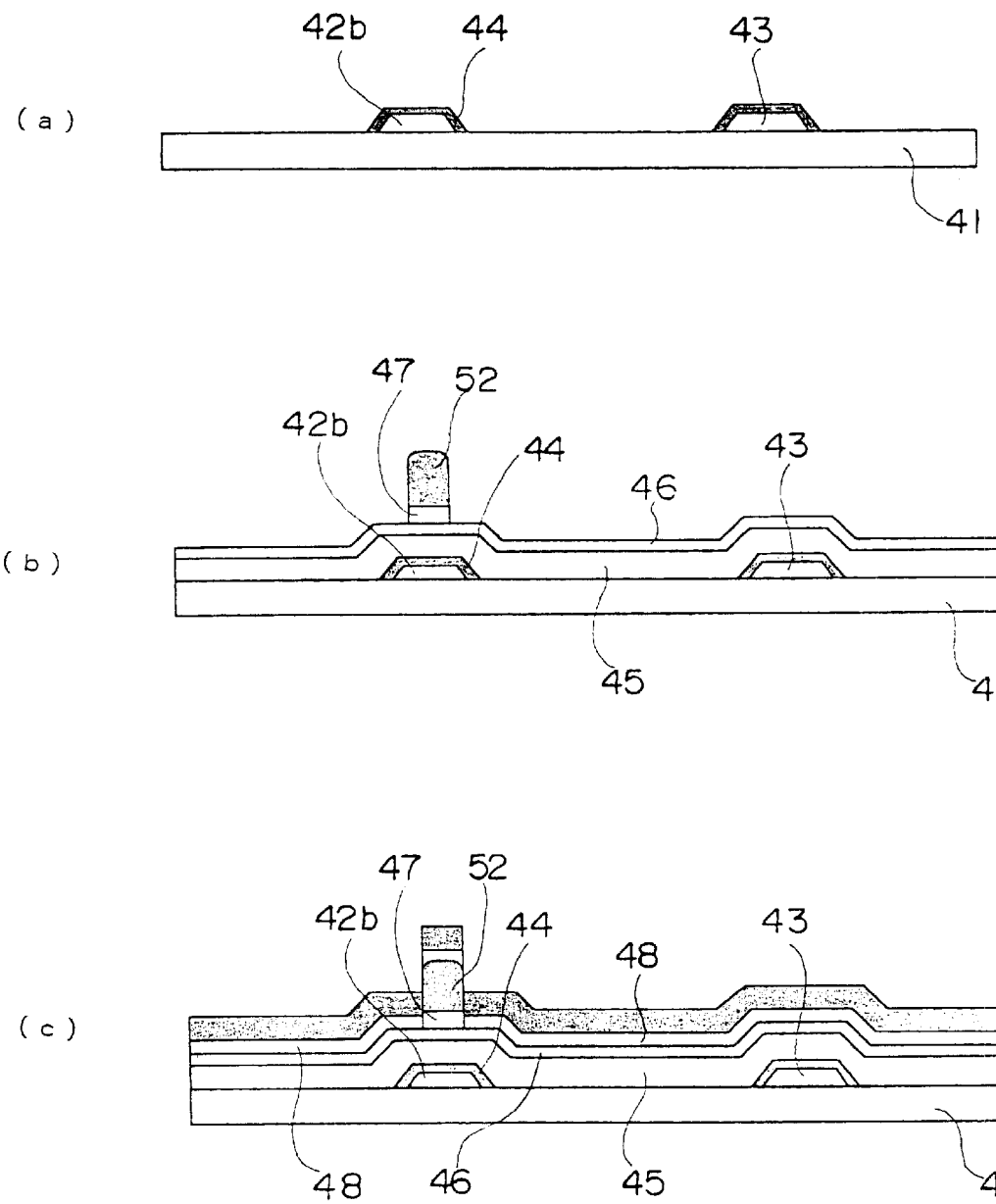
FIG. 13 is an explanatory view showing the former half of the manufacturing steps of the liquid crystal display element according to prior art example 2.
Figure 14:
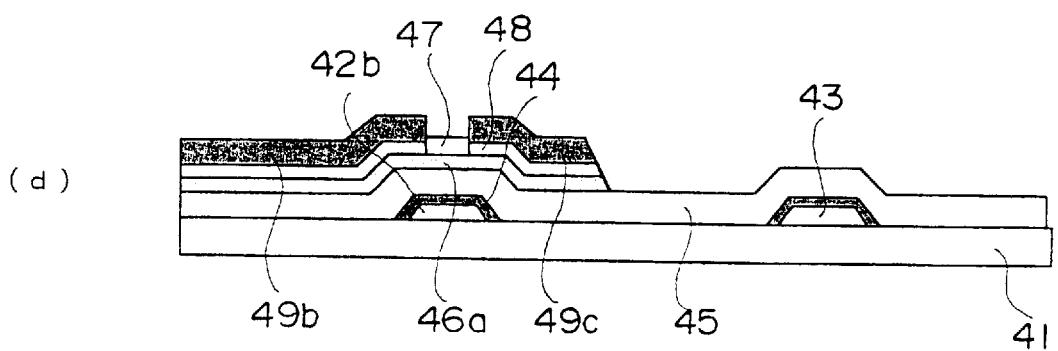
FIG. 14 is an explanatory view showing the latter half of the manufacturing steps of the liquid crystal display element according to prior art example 2.
Figure 14:
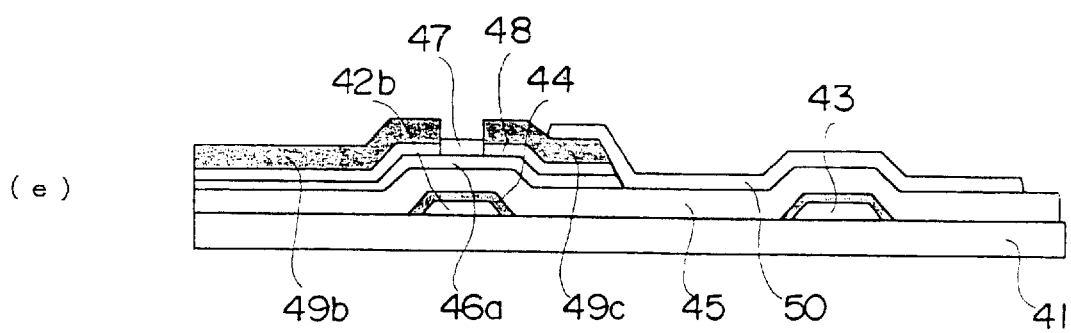
Figure 14:
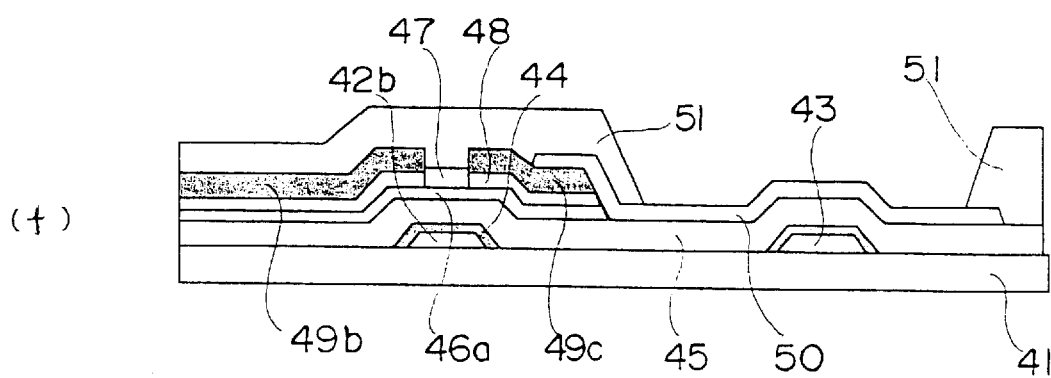
Figure 15:
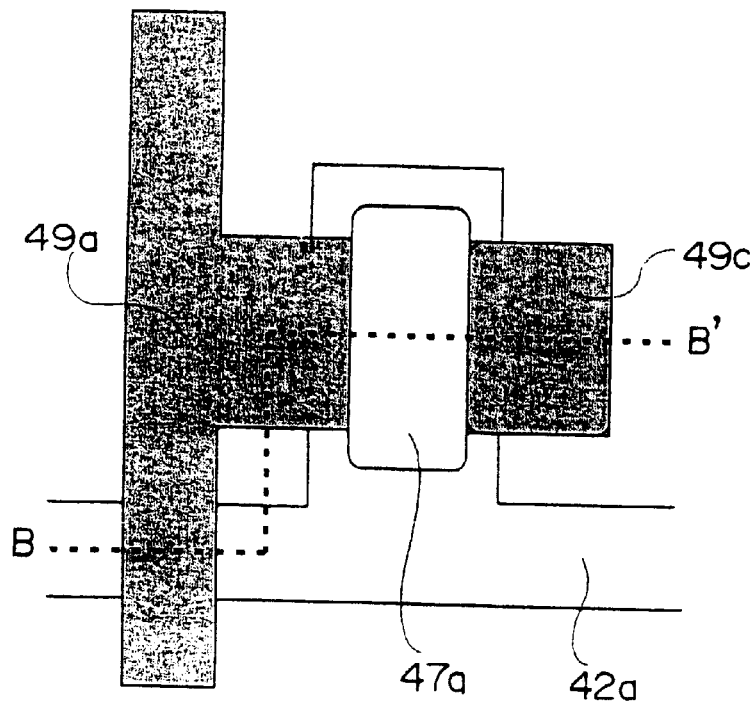
FIG. 15 is a plan view and an explanatory cross-sectional view showing the TFT portion of the liquid crystal display device according to prior art example 2.
Figure 15:
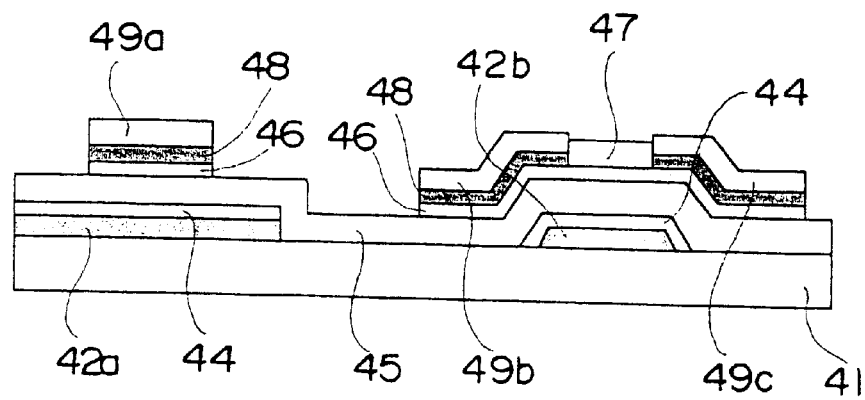

If the side end surface 72 of the channel protection film 7 is shaped as a "normal taper" as shown in the comparison example of FIG. 6, where the lower portion is protruded than the upper portion, the contact area between the a-Si layer 6a and the n+-Si layer 8 becomes too small, which causes characteristic malfunction of the TFT element (especially the ON current malfunction), and therefore not preferable.

However, according to the present embodiment, the side end surface 71 of the channel protection film is formed as an inverse taper. Therefore, as shown in FIG. 4(b), the contact area between the a-Si layer 6a and the n+-Si layer 8 could be secured, and no characteristic malfunction of the TFT element is generated.

Next, the anodic oxidation film 4 and the gate insulation film 5 is etched through photolithography to a predetermined pattern in order to form the wire take-out terminal pad (not shown) for the source signal wire 9a and the gate signal wire 2a.

Next, as shown in FIGS. 3(d) and 3(e), an n+-Si layer 8 which is a semiconductor junction layer, a source signal wire 9a, a source electrode 9b, and a drain electrode 9c are formed by successively forming a n+-Si layer 8 (approximately 50 nm), and a metal layer 9 (approximately 250 nm) formed of Ta, and then patterning the layers to the desired shape by photolithography.

Since the side surface 71 of the channel protection film is formed as an inverse taper, the source electrode 9b and the drain electrode 9c will not cover the channel protection layer 7, but instead, is discontinued. In other words, the channel protection film 7, the source electrode 9b and the drain electrode 9c are all formed in a self-conforming manner, which leads to reducing the dispersion of the parasitic capacity (CgD) between the gate electrode 2b-drain electrode 9c within the substrate and the panel surface caused during the photolithography steps.

The relation between the film thickness of the channel protection film, the taper angle and the generation of step discontinuity according to the present embodiment is explained with reference to FIG. 5. The taper angle $\theta(°)$ refers to the angle of the inverse taper surface to the horizontal surface. The size of the utilized substrate 1 is 5-inch square. In the chart of FIG. 5, ⊙ refers to step discontinuity being generated throughout the whole plane, ○ refers to step discontinuity being generated except for a portion within the plane, Δ refers to step discontinuity being generated only in a portion of the plane, and X refers to no step discontinuity being generated. As shown in FIG. 5, when the film thickness of the channel protection film 7 having an inverse taper shape is equal to or over 350 nm, the n+-Si layer 8 and the metal layer 9 for forming the source and drain electrodes are discontinued without covering the channel protection film 7. In other words, the liquid crystal display element having the structure according to embodiment 1 will not be influenced by the mismatch of the pattern of the source/drain electrode 9b/9c. Therefore, the inner-plane unevenness or the flickering of the display is reduced.

When considering the fact that the channel length (L) and the width (W) used generally in an active matrix is L; 5–10

μm and W; 10–50 μm, according to FIG. 5, the step discontinuity is formed throughout the whole plane when the area ratio of the junction surface area of the channel protection film 7 adjoining the passivation film 11 being formed above the protection film and the junction surface area of the channel protection film adjoining the semiconductor layer (such as an intrinsic semiconductor layer and the like) being formed below the channel protection film (area of the junction surface adjoining the passivation film/area of the junction surface adjoining the semiconductor layer) is 1.05 or more. In other words, the source/drain electrodes 9b/9c are both formed in a self-conforming manner, and the parasitic capacity (Cgd) of the drain electrode 9c and the gate electrode 2b is therefore not influenced by the mismatch of the pattern of the source/drain electrodes 9b/9c. Thereby, the inner-plane unevenness or the flickering of the display is reduced.

When the taper angle of the channel protection film 7 having an inverse taper shape is 45 degrees or less, the n+-Si layer 8 and the metal layer 9 for forming the source and drain electrodes will be discontinued, and will not cover the channel protection film 7. In other words, the source/drain electrodes 9b/9c are both formed in a self-conforming manner, and the parasitic capacity (Cgd) of the drain electrode 9c and the gate electrode 2b is therefore not influenced by the mismatch of the pattern of the source/drain electrodes 9b/9c. Thereby, the inner-plane unevenness or the flickering of the display is reduced.

The TFT portion that acts as the switching element is formed for every pixel according to the method explained above.

Next, the transparent conductive film made of ITO is formed thereon through sputtering method to a thickness of approximately 100 nm, and then, through photolithography, pixel electrode 10 is formed (refer to FIG. 3f).

Next, silicon nitride film is formed as a passivation film 11 with a thickness of 30 to 200 nm (refer to FIG. 3g). At this time, a silicon oxide film, a tantalum oxide film, or an aluminum oxide film may be used instead of the silicon nitride film. The liquid crystal display element according to the invention is manufactured by the above method. Further, though Ta is used according to the present embodiment as the material for the wire and the electrode, other materials such as Al, Mo and Ti may also be used.

According to the present embodiment, the channel protection film, the source electrode and the drain electrode are all formed in a self-conforming manner, and the parasitic capacity (Cgd) between the drain electrode and the gate electrode are thereby not influenced by the mismatch of the pattern of the source/drain electrodes. In other words, according to the present invention, the inner-plane unevenness or the flickering of the display is reduced. According further to the invention, the patterning of both the channel protection film and the semiconductor layer is performed by one photolithography step, which leads to reducing the number of photolithography steps compared to the prior art methods.

As explained, the present invention realizes a liquid crystal display element providing improved display quality, reduced manufacturing cost and higher reliability that may be applied to a large high definition display.

We claim:

1. A liquid crystal display element comprising:
    a pair of transparent insulating substrates facing each other with a liquid crystal layer placed in between;
    a thin-film transistor including a gate electrode formed on one of said pair of transparent insulating substrates, a gate insulation film formed on said gate electrode, a semiconductor layer formed on said gate insulation film, a channel protection film arranged on said semiconductor layer, a semiconductor junction layer formed over at least a portion of the semiconductor layer, a source electrode, and a drain electrode; and
    a pixel electrode,
    said thin-film transistor being positioned near a crossing point of one of a plurality of gate signal wires and one of a plurality of source signal wires, said gate electrode being connected to said gate signal wire and said source electrode being connected to said source signal wire in the vicinity of said crossing point, and said drain electrode being connected to said pixel electrode;
    wherein an end of said drain electrode and an end of said source electrode being separated above said semiconductor layer by said channel protection film, the side surface of said channel protection film being formed as an inverse taper; and
    wherein a top surface of the channel protection film covers a portion of, but not all of, the source electrode of the thin-film transistor.

2. The liquid crystal display element according to claim 1, wherein said semiconductor layer is an intrinsic semiconductor layer.

3. The liquid crystal display element according to claim 1, wherein the thickness of said channel protection film is 350 nm or more.

4. The liquid crystal display element according to claim 1, wherein a ratio of the junction surface area of said channel protection film adjoining a passivation film formed above said protection film and the junction surface area of said film adjoining an intrinsic semiconductor layer formed below said film (area of the junction surface adjoining said passivation film/area of the junction surface adjoining said semiconductor layer) is 1.05 or more.

5. A liquid crystal display comprising:
    a thin film transistor supported by a substrate, the thin film transistor including a gate electrode, a source electrode and a drain electrode, wherein a semiconductor layer is provided above at least a portion of the gate electrode;
    a pixel electrode in electrical communication with the drain electrode of the thin film transistor;
    a channel protection film provided over at least part of a channel of the thin film transistor, wherein the channel protection film is provided between the source and drain electrodes so that the source and drain electrodes of the thin film transistor are spaced apart from one another; and
    wherein a side surface of the channel protection film is sloped so as to have an inverse taper shape so that an upper surface of the channel protection film has a larger surface area than a lower surface of the channel protection film, and wherein the upper surface of the channel protection film covers a portion of, but not all of, the source electrode of the thin-film transistor.

6. A liquid crystal display comprising:
    a thin film transistor supported by a substrate, the thin film transistor including a gate electrode, a source electrode and a drain electrode, wherein a semiconductor layer is provided above at least a portion of the gate electrode;
    a pixel electrode in electrical communication with the drain electrode of the thin film transistor;
    a channel protection film provided over at least part of a channel of the thin film transistor, wherein the channel protection film is provided between the source and drain electrodes so that the source and drain electrodes of the thin film transistor are spaced apart from one another; and wherein a side surface of the channel protection film is sloped so as to have an inverse taper shape so that an upper surface of the channel protection film has a larger surface area than a lower surface of the channel protection film, and wherein the lower surface of the channel protection film does not extend laterally beyond a periphery of the semiconductor layer of the thin film transistor.

7. A liquid crystal display comprising:

a thin film transistor supported by a substrate, the thin film transistor including a gate electrode, a source electrode and a drain electrode, wherein a semiconductor layer is provided above at least a portion of the gate electrode;

a pixel electrode in electrical communication with the drain electrode of the thin film transistor;

a channel protection film provided over at least part of a channel of the thin film transistor, wherein the channel protection film is provided between the source and drain electrodes so that the source and drain electrodes of the thin film transistor are spaced apart from one another; and wherein a side surface of the channel protection film is sloped so as to have an inverse taper shape so that an upper surface of the channel protection film has a larger surface area than a lower surface of the channel protection film, and wherein no portion of the pixel electrodes is located over any part of the channel protection film.

8. The display of claim 5, further comprising a semiconductor junction layer provided over at least a portion of the semiconductor layer of the transistor, and wherein the channel protection film is provided between first and second spaced apart portions of the semiconductor junction layer.

9. The display of claim 6, further comprising a semiconductor junction layer provided over at least a portion of the semiconductor layer of the transistor, and wherein the channel protection film is provided between first and second spaced apart portions of the semiconductor junction layer.

10. The display of claim 7, further comprising a semiconductor junction layer provided over at least a portion of the semiconductor layer of the transistor, and wherein the channel protection film is provided between first and second spaced apart portions of the semiconductor junction layer.

* * * * *